United States Patent [19]
Vaidyanthan et al.

[11] Patent Number: 5,959,214
[45] Date of Patent: Sep. 28, 1999

[54] STRAIN GAUGE WITH STEEL SUBSTRATE

[75] Inventors: Aparna Vaidyanthan, Carmel; Robert Keith Constable, Kokomo; Shailendra Verma, Indianapolis, all of Ind.

[73] Assignee: Delco Electronics Corp., Kokomo, Ind.

[21] Appl. No.: 08/995,801

[22] Filed: Dec. 22, 1997

[51] Int. Cl.[6] .................................................. H01L 29/96
[52] U.S. Cl. ............................................... 73/777; 73/780
[58] Field of Search .............................. 73/777, 778, 779, 73/780

[56] References Cited

U.S. PATENT DOCUMENTS

| | | | |
|---|---|---|---|
| 3,758,830 | 9/1973 | Jackson | 73/777 |
| 4,085,620 | 4/1978 | Tanaka | 73/777 |
| 5,417,115 | 5/1995 | Burns | 73/778 |
| 5,511,428 | 4/1996 | Goldberg et al. | 73/777 |
| 5,616,514 | 4/1997 | Muchow et al. | 73/777 |
| 5,756,901 | 5/1998 | Kurle et al. | 73/777 |

*Primary Examiner*—Max Noori
*Attorney, Agent, or Firm*—Jimmy L. Funke

[57] ABSTRACT

A strain gauge has a stainless steel substrate with a dielectric coating comprising two dielectric layers. A circuit comprising conductors, resistors and piezoresistors in a Wheatstone bridge configuration is formed on the dielectric. One dielectric layer is to adhere to the steel and a second is to form a barrier against diffusion of the first layer into the piezoresistor material. An amplification and signal conditioning circuit is applied adjacent the bridge. The steel substrate is to be welded or bolted at its marginal portions to a structure subject to strain.

7 Claims, 1 Drawing Sheet

STRAIN GAUGE WITH STEEL SUBSTRATE

FIELD OF THE INVENTION

This invention relates to a strain gauge and particular to an inexpensive gauge having a high gauge factor and suitable for welding or bolting to a structural member subject to strain measurement.

BACKGROUND OF THE INVENTION

It is desirable in automotive and industrial applications to have a strain gauge which is inexpensive, rugged and weldable or boltable to a member subject to strain and still have a high gauge factor. Commercial weldable strain gauges can be classified into three categories—foil type gauges with low gauge factors, sheathed weldable gauges and the expensive high gauge factor semiconductor gauges. The inexpensive foil type gauges are made of foil strain elements attached to pieces of metal using adhesives. The performance of such gages depends on the reliability and transmissibility of strain through the adhesive. These foil gauges have a gauge factor in the range of 2 to 8. There is a need for a relatively inexpensive, small and weldable strain gauge with a reasonably high gauge factor which could survive harsh environmental conditions for a long period of time. It is also desirable for such a strain gauge to be applicable to a wide range of steel structural members without thermal stress due to a mismatch of thermal coefficients of expansion.

SUMMARY OF THE INVENTION

It is therefore an object of the invention to obtain an inexpensive weldable or boltable strain gauge which is rugged and has a relatively high gauge factor.

The invention is carried out by a gauge having a steel substrate covered with a dielectric coating and a thick film bridge circuit containing strain sensitive piezoresistors and a signal conditioning integrated circuit adjacent and connected to the bridge circuit to output the gauge signal. The ends or corners of the steel substrate can then be welded or bolted at its margins to a structure subject to strain for efficient transfer of the strain to the piezoresistors.

BRIEF DESCRIPTION OF THE DRAWINGS

The above and other advantages of the invention will become more apparent from the following description taken in conjunction with the accompanying drawings wherein like references refer to like parts and wherein.

DESCRIPTION OF THE INVENTION

Figure 1:
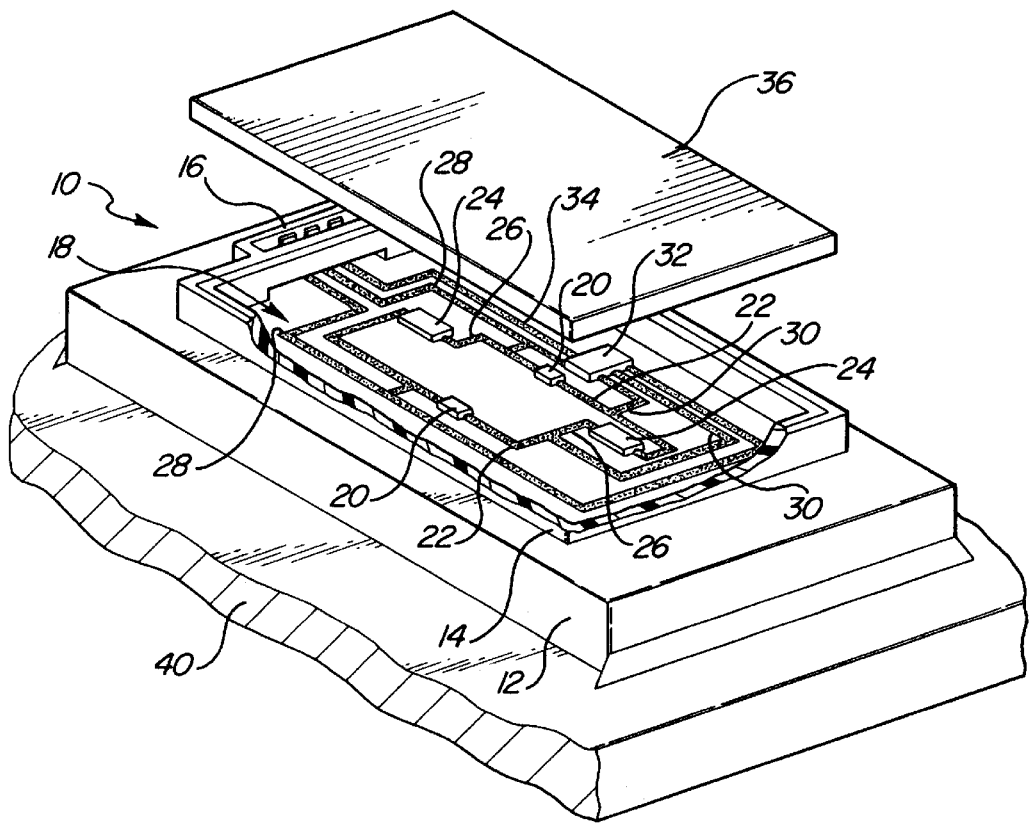
FIG. 1 is a partly broken away isometric view of a strain gauge with cover removed and an underlying structural member according to the invention.

Referring to FIG. 1, a strain gauge 10 comprises an insulated stainless steel substrate 12 supporting a housing 14 having a circuit connector 16 at one end. The housing contains a hybrid circuit including a Wheatstone bridge 18 having two thick film passive resistors 20 in one pair of opposite arms 22 and two thick film piezoresistors 24 in another pair of opposite arms 26. The piezoresistors afford a gauge factor of about 20. Ground and power lines 28 are supplied to the bridge 18 by the connector 16. Bridge output lines 30 are coupled to a signal conditioning and amplification integrated circuit 32 which has its output 34 connected to the connector. A metal or plastic cover 36 fits on the housing to protect the circuit. The steel substrate 12 extends beyond the housing sufficiently to permit welding or bolting at its margins to a structural member 40 subject to strain measurement. The gauge is applied in a manner to effect bending of the substrate to deform each piezoresistor.

Figure 2:
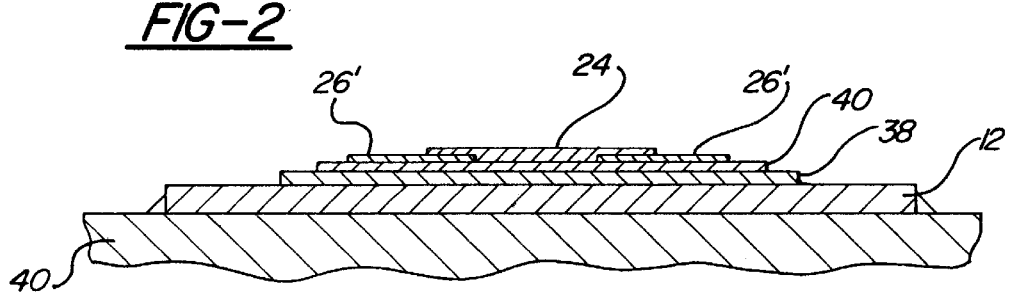
FIG. 2 is a cross section of a gauge illustrating the gauge and structural member structure.

The welds may extend along the ends of the substrate 12, as shown in FIGS. 1–2 but a spot weld at each corner will suffice to transmit strain from the structural member to the substrate. The piezoresistors 24 are printed directly on the insulated substrate so the strain in the substrate is transmitted perfectly to them to generate a bridge signal. The thick film piezoresistor bridge has a gauge factor of about 20. The proximity of the signal conditioning electronics to the origin of the signal and the high gauge factor of the piezoresistors reduce the noise to afford a clean robust strain signal.

FIG. 2 shows the layered structure of the strain gauge. An insulating coating covering the whole surface of the substrate 12 or just the region within the housing 14 comprises a base layer 38 of dielectric and an interface layer 40 of dielectric. Thick film circuit conductors 26' are deposited on the top of the layer 40 and high gauge factor thick film piezoresistor (TFPR) material 24 is formed over the layer 40 to bridge the conductors 26'.

The base layer 38 is a commercially available dielectric material which adheres well to the stainless steel. DuPont and Electro-Science Laboratories, Inc. (ESL) are sources of such materials. Specifically, suitable dielectric materials are ESL D-4914 ink, ESL D-41030-25C tape, DuPont QM44 ink, and DuPont HD-3 tape. Inks are applied by screen printing and then fired.

The composition of the interface dielectric 40 ink or tape is formulated to eliminate or control substrate interaction by blocking diffusion of the dielectric 38 into the TFPR material to thereby prevent degradation of the gauge factor of the TFPR. An example of such material is shown in the following table.

| Ingredient | Weight Percent |
|---|---|
| Organic Media | 27.4 |
| Frit | 36.3 |
| $Al_2O_3$ | 32.9 |
| ZnO | 3.4 |

The frit comprises

| Ingredient | Weight Percent |
|---|---|
| PbO | 53.3 |
| $H_3BO_3$ | 15.1 |
| $SiO_2$ | 19.4 |
| $Al_2O_3$ | 8.2 |
| $TiO_2$ | 1.0 |
| CuO | 3.0 |

Additional details concerning these interface materials and the method of making a piezoresistive sensor are provided in U.S. Ser. No. 08/994,113 of Ellis entitled "DIFFUSION-BARRIER MATERIALS FOR THICK-FILM PIEZORESISTOR AND SENSORS FORMED THEREWITH" filed Dec. 19, 1997 and assigned to the assignee of this invention, and incorporated herein by reference.

It will thus be seen that a weldable or boltable strain gauge having a gauge factor of about 20 can be made inexpensively and results in a rugged device which yields a clean robust strain signal.

The embodiments of the invention in which an exclusive property or privilege is claimed are defined as follows:

1. A strain gauge comprising:
   a steel substrate having marginal portions that are adapted to be welded or bolted to a structural member subject to strain;
   a dielectric layer on the substrate;
   a strain sensing circuit on the dielectric layer including piezoresistors directly on the dielectric layer; and
   a signal processing circuit on the substrate adjacent the strain sensing circuit and coupled to the strain sensing circuit to produce an output signal indicative of said strain.

2. A strain gauge as defined in claim 1 wherein the strain sensing circuit comprises a bridge including passive resistors as well as the piezoresistors.

3. A strain gauge as defined in claim 1 wherein the strain sensing circuit comprises:
   a Wheatstone bridge having two pairs of arm;
   a passive resistor in each arm of one pair of arms; and
   one of the piezoresistors in each arm of the other pair of arms.

4. A strain gauge as defined in claim 1 wherein:
   the strain sensing circuit comprises a bridge including passive resistors as well as the piezoresistors; and
   the gauge having a connector with first and second conductors coupled to the bridge and to the signal processing circuit for supplying power and ground voltages, and a third conductor coupled to the signal processing circuit to carry the output signal.

5. In combination:
   a structure subject to a strain; and
   a strain gauge for sensing the strain, including a steel plate having a bottom surface in contact with the structure and marginal portions that are welded or bolted to the structure, a dielectric layer formed on a top surface of said steel plate opposite to said bottom surface, strain sensing piezoresistor elements formed on said dielectric layer in a central region within said marginal portions, and a signal processing circuit mounted on the dielectric layer adjacent the strain sensing elements and coupled to the strain sensing elements for producing an output signal indicative of the sensed strain.

6. The combination of claim 5, wherein said strain sensing elements and said signal processing circuit are contained within a housing including side walls mounted on the top surface of said steel plate in said central region and a cover mounted on said side walls.

7. The combination of claim 6, wherein said housing includes a connector portion integral with and adjacent to one of said side walls, the connector portion housing terminals that are electrically coupled to said strain sensing elements and said signal processing circuit.

* * * * *